United States Patent [19]

Hamaekers et al.

[11] Patent Number: 5,178,376

[45] Date of Patent: Jan. 12, 1993

[54] HYDRAULICALLY DAMPED RUBBER CARTRIDGE SPRING

[75] Inventors: Arno Hamaekers, Gorxheimertal; Axel Rudolph, Darmstadt, both of Fed. Rep. of Germany

[73] Assignee: Firma Carl Freudenberg, Hoehnerweg, Fed. Rep. of Germany

[21] Appl. No.: 561,726

[22] Filed: Aug. 1, 1990

[30] Foreign Application Priority Data

Oct. 5, 1989 [DE] Fed. Rep. of Germany ....... 3933197

[51] Int. Cl.$^5$ ............................................. F16M 1/00
[52] U.S. Cl. .............................. 267/140.12; 267/219; 267/140.11
[58] Field of Search ............... 248/559, 562, 635, 636, 248/638; 267/35, 140.1 AE, 140.1 C, 140.1 E, 141.2, 141.3, 141.4, 219, 293

[56] References Cited

U.S. PATENT DOCUMENTS

| 4,836,515 | 6/1989 | Franz et al. ........................ 248/566 |
| 4,871,152 | 10/1989 | Funahashi ........................ 267/140.1 |
| 4,884,789 | 12/1989 | Takeda et al. ..................... 267/140.1 |
| 4,921,229 | 5/1990 | Hori ................................. 267/140.1 |
| 4,936,555 | 6/1990 | Ishiyama et al. .................. 267/140.1 |
| 4,971,300 | 11/1990 | Ticks ................................. 267/219 |

FOREIGN PATENT DOCUMENTS

| 0009120 | 4/1980 | European Pat. Off. . |
| 0304349 | 2/1989 | European Pat. Off. ......... 267/140.1 |
| 0168931 | 9/1985 | Japan ............................. 267/140.1 |
| 0172743 | 9/1985 | Japan ............................. 267/140.1 |
| 0088834 | 4/1987 | Japan ............................. 267/140.1 |
| 0266240 | 11/1988 | Japan ............................. 267/140.1 |

Primary Examiner—Matthew C. Graham
Assistant Examiner—Chris Schwartz
Attorney, Agent, or Firm—Sprung Horn Kramer & Woods

[57] ABSTRACT

A hydraulically damped rubber cartridge spring has two liquid-filled chambers 1, 3 and 2, 4. The chambers 1, 2, 3, 4 of the chamber pairs are spaced apart from one another in an axial direction, and the chambers 1, 2, 3, 4 of each chamber pair 1, 3 and 2, 4 are connected via a separated damping opening 5, 6 and filled with liquid. Each damping opening 5,6 is dimensioned and adjusted to the sum of the bulging elasticities of the walls of the respective pair of chambers to which it is connected.

5 Claims, 6 Drawing Sheets

SECTION A-A

SECTION A-A

SECTION B-B

SECTION A-A

SECTION B-B

HYDRAULICALLY DAMPED RUBBER CARTRIDGE SPRING

BACKGROUND OF THE INVENTION

The invention relates to a hydraulically damped rubber cartridge spring comprising an external sleeve and an internal pipe which are supported, one on the other, by an elastomeric (e.g., rubber) spring body. At least two liquid-filled pairs of chambers are provided in the spring body, spaced apart in the direction of the damped motion. The chambers of each pair are connected to each other via a liquid-filled damping opening.

A rubber cartridge spring of this type is known from European Patent application No. 0 009 120. The damping actions achieved are effective in only a certain frequency range which is only marginally satisfactory.

SUMMARY OF THE INVENTION

It is a principal object of the present invention to further develop a rubber cartridge spring of this type such that its damping action is improved and covers a larger frequency range.

This object, as well as other objects which will become apparent in the discussion that follows, are achieved, in accordance with the invention, by adjusting and dimensioning the damping openings to the sum of the bulging elasticities of the pairs of chambers, such that the liquid contained in the chambers is made to resonate when vibrations of a mutually different frequency are introduced.

In the rubber cartridge spring in accordance with the invention, each damping opening is dimensioned and adjusted to the bulging elasticities of the walls of chambers on both sides such that when the frequencies of the introduced vibrations deviate from one another, the liquid contained in the chambers is made to resonate. In order to accomplish this effect, the chambers of the individual chamber pairs may have walls of different bulging elasticities and may be connected via damping openings of different dimensions. As far as the bulging elasticity is concerned, the total bulging elasticity of the walls of each pair of chambers has to be considered as a whole. Within each pair of chambers, it is thus possible to provide one chamber that is identical to one chamber of another pair of chambers with respect to the bulging elasticity of the wall.

The dimensions of the damping openings ca be changed by varying their cross section and/or length. It is thus often possible to adjust them to cause a certain frequency of vibrations to be damped in a particularly simple manner.

Essential in this respect is the one frequency of vibrations introduced at which the liquid contained in the damping opening is made to resonate by the sum of the bulging elasticities of the walls of the two adjacent chambers. The respective conditions for the area of the two damping openings can be determined so as to be distinct from one another even if the chambers have a common top chamber. An embodiment of this kind gains particular importance with respect to a more simple manufacture of the proposed rubber cartridge spring.

Further features, objects and advantages of the present invention will become apparent from the following description taken in conjunction with the accompanying drawings.

DESCRIPTION OF THE PREFERRED EMBODIMENTS

Figure 1:
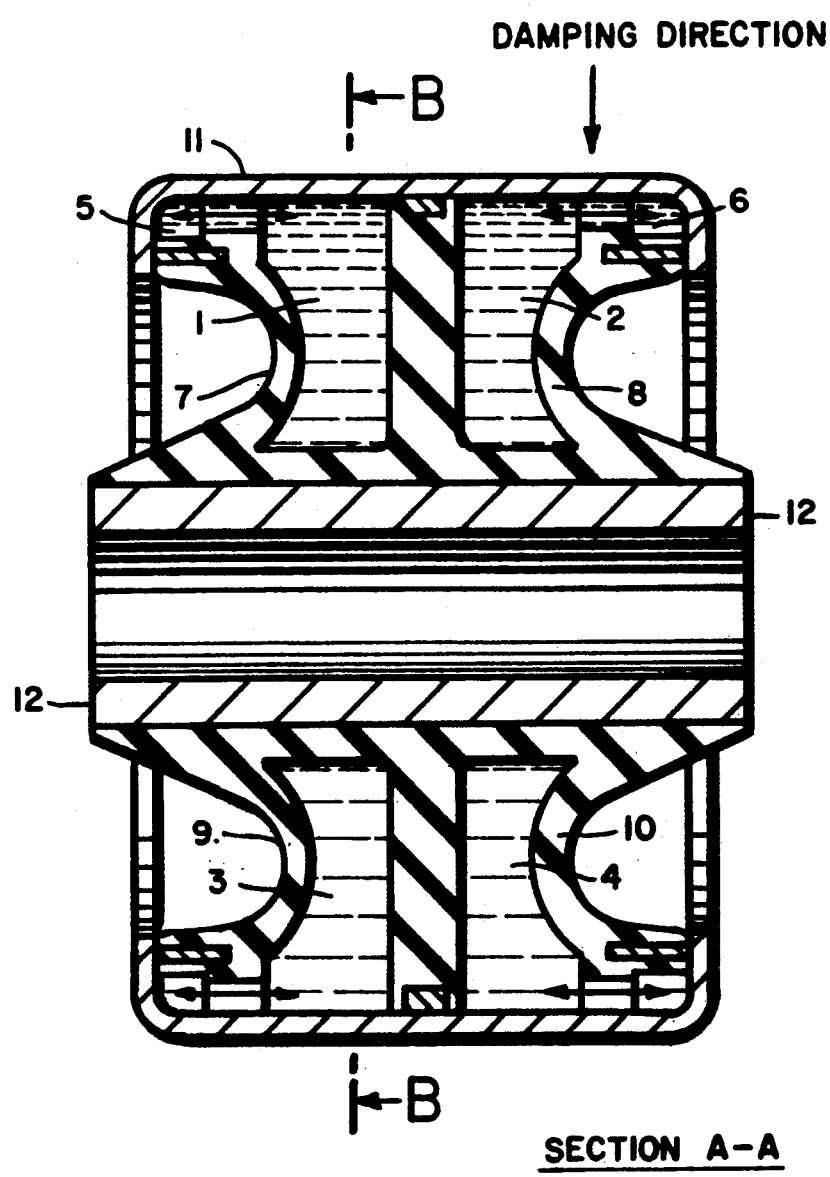
FIG. 1 is a longitudinal section of a rubber cartridge spring according to one embodiment of the present invention.
Figure 2:
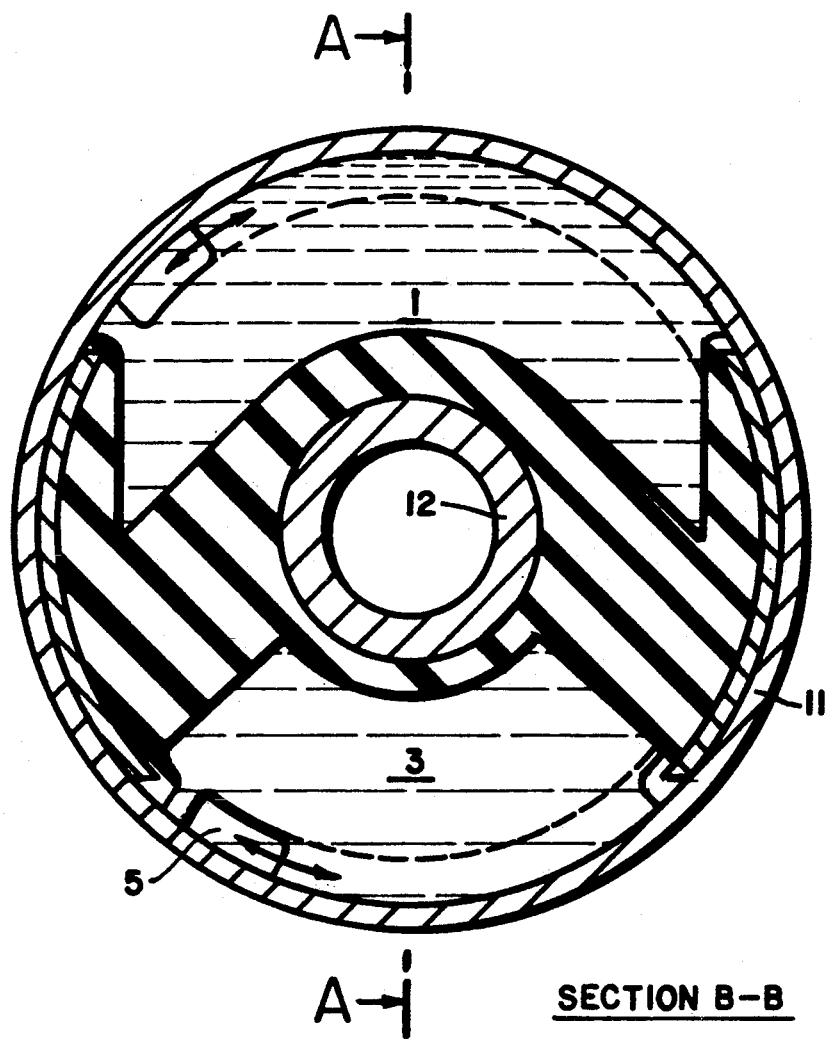
FIG. 2 is a cross section of the rubber cartridge spring of FIG. 1.

The rubber cartridge spring of FIGS. 1 and 2 includes an external sleeve 11 and an internal pipe 12 which, with an inserted body of rubber, provide a liquid tight enclosure. The rubber body contains two pairs of chambers, 1 and 3, on one hand, and 2 and 4 on the other, which are placed in the direction of damping (indicated by the arrow in FIG. 1). The chamber pairs are separated by elastic walls and filled with a hydraulic liquid. The chambers 1, 3 and 2, 4 of each pair are connected, respectively, in a liquid tight manner via a channel-like damping opening 5 and 6. The damping openings 5, 6 have an identical cross section. The front walls 7, 9 and 8, 10 bounding the chambers 1, 3, and 2, 4, respectively, in the axial direction have different bulging elasticities as shown. The individual values are determined such that the total measurable bulging elasticities in each pair of chambers 1, 3 and 2, 4 differ from another. When vibrations are introduced, the liquid contained in the damping opening 5 is made to resonate at a frequency distinct from the one of the liquid contained in the damping opening 6. Accordingly, the damping actions of the damping openings 5 and 6 occur at different frequency ranges.

Figure 3A:
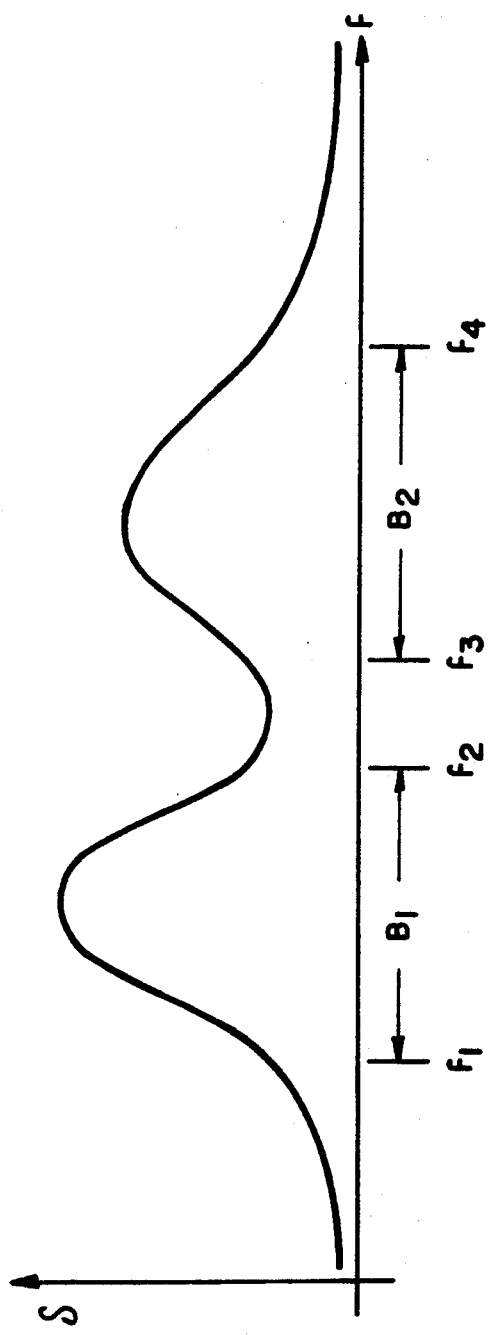
FIGS. 3A and 3B are graphs showing, respectively, the damping (FIG. 3A) and the spring rate (FIG. 3B) of the rubber cartridge spring of FIGS. 1 and 2, in dependence upon the frequency of the vibrations introduced.
Figure 3B:
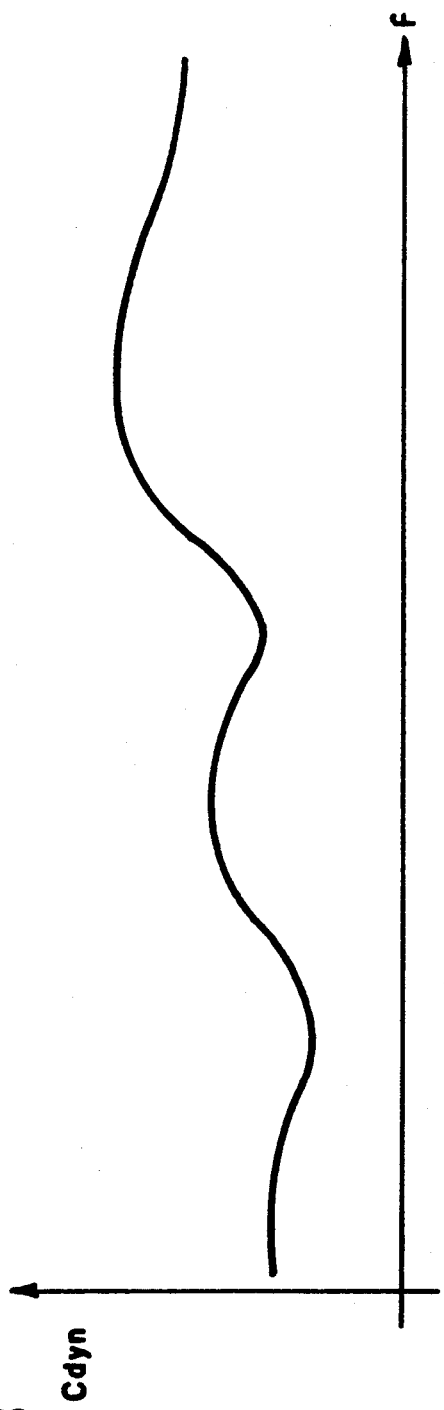

In FIG. 3A, the damping actions of openings 5 and 6 are referenced as $B_1$ and $B_2$, respectively. At the corresponding locations, the spring rates exhibit smaller slopes as shown in FIG. 3B.

Figure 4:
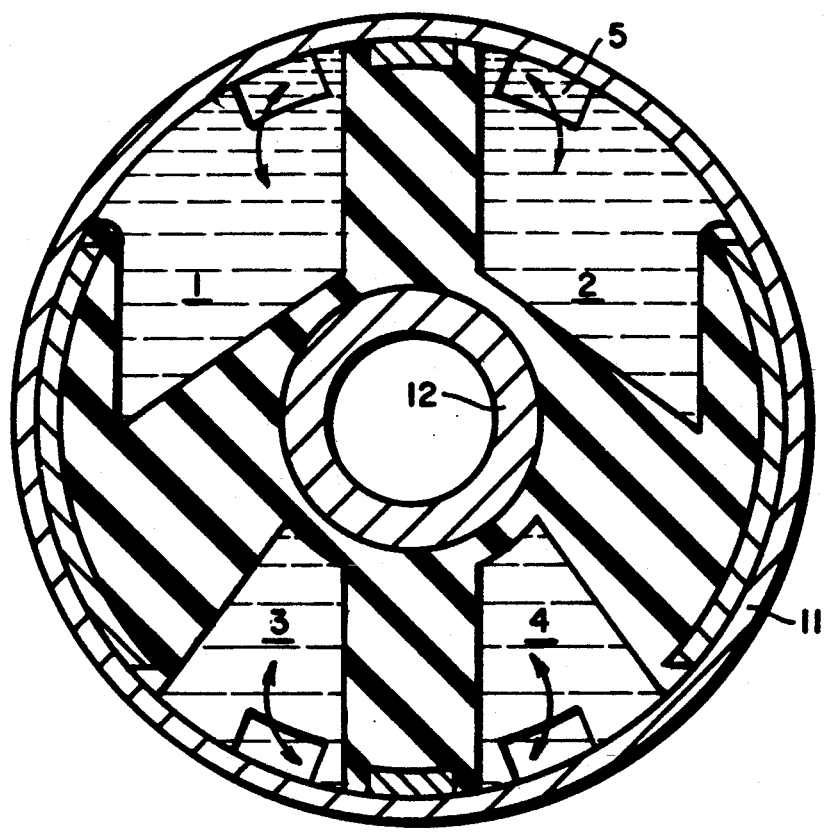
FIG. 4 is a cross section of a differently configured rubber cartridge spring according to the present invention.

FIG. 4 is a cross section of an embodiment where the chambers 1, 3 and 2, 4 which form the respective chamber pairs are placed laterally next to each other. The rubber cartridge spring thus exhibits a greater rigidity in transverse direction than it does in longitudinal direction. The remaining configuration corresponds to the one described above in connection with FIGS. 1 and 2.

Figure 5:
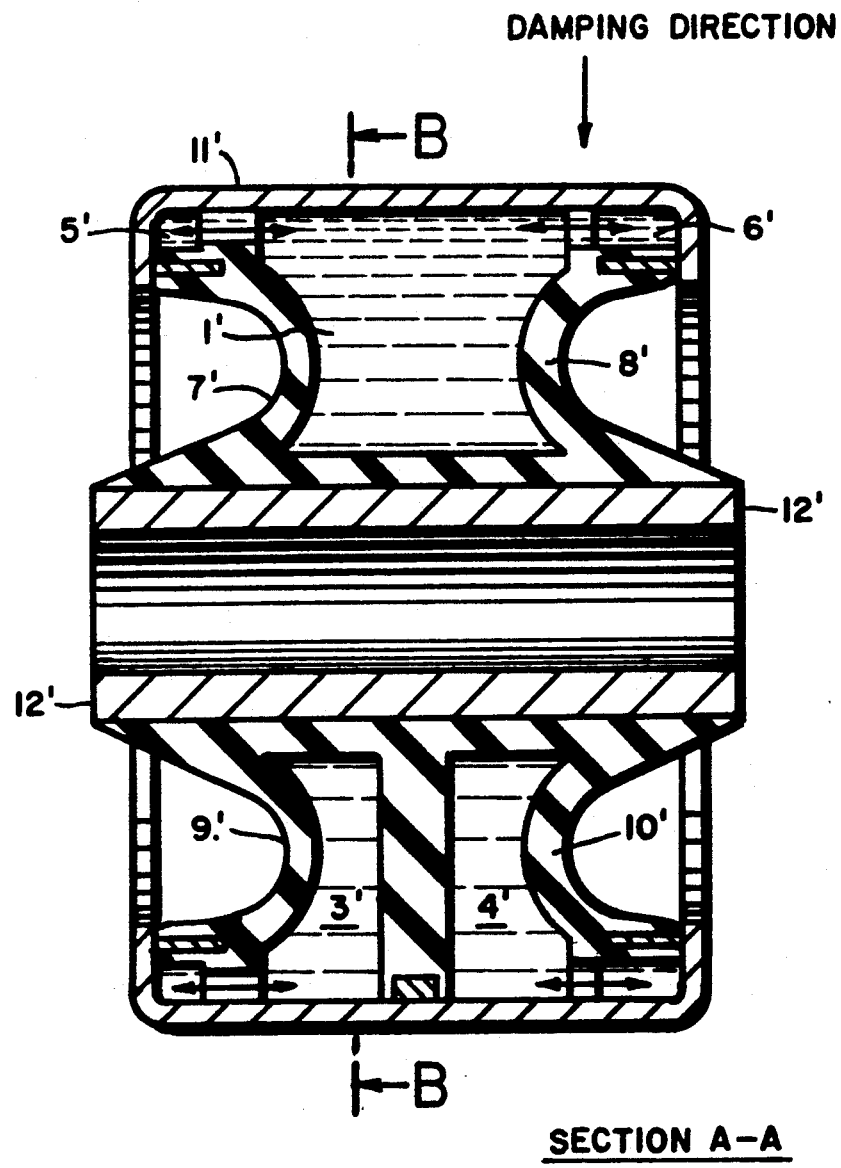
FIG. 5 is a longitudinal section of a rubber cartridge spring according to another embodiment of the present invention.
Figure 6:
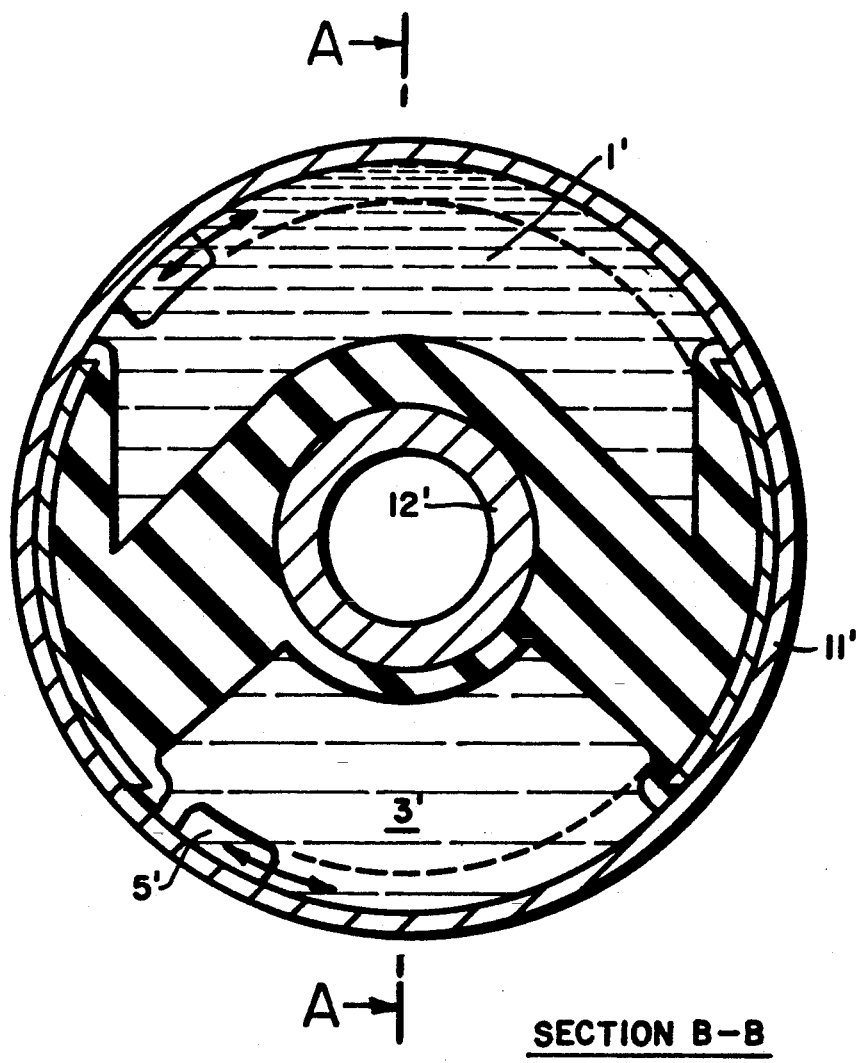
FIG. 6 is a cross-section of the rubber cartridge spring of FIG. 5.

FIGS. 5 and 6 show another embodiment of the rubber cartridge spring according to the present invention wherein the pairs of chambers have a common top chamber 1' joining one to the other. In this case, the pairs of chambers are formed by the chambers 1' and 3', on one hand, and chambers 1' and 4' on the other.

As may be seen in FIG. 5, the damping opening 5' connecting the chamber pair 1', 3' has a larger cross-section than the opening 6' connecting the chamber pair 1', 4'.

There has thus been shown and described an improved hydraulically damped rubber cartridge spring which fulfills all the objects and advantages sought therefor. Many changes, modifications, variations and other uses and applications of the subject invention, will, however, become apparent to those skilled in the art after considering this specification and the accompanying drawings which disclose the preferred embodiments thereof. All such changes, modifications, variations and other uses and applications which do not depart from the spirit and scope of the invention are intended to be covered by the invention which is limited only by the following claims.

What is claimed is:

1. In a hydraulically damped rubber cartridge spring, comprising an external sleeve and an elongate internal tube having a longitudinal central axis, said external sleeve and said internal tube being supported, one on the other, by an elastomeric spring body having two opposing ends, said internal tube being movable laterally with respect to said external sleeve in response to laterally introduced vibrations, said spring body having a plurality of walls defining two liquid-filled pairs of chambers arranged in axial adjacent relationship at the opposing ends of the spring body, with one pair at each end, the chambers of each pair being spaced apart in the direction of said lateral vibrations with at least one wall of each chamber providing a bulging elasticity, the chambers of each pair being connected via a liquid-filled damping opening; the improvement wherein each damping opening is dimensioned and adjusted to the sum of the bulging elasticities of the walls of the respective pair of chambers to which it is connected, such that the liquid contained in the chambers is made to resonate when vibrations of a mutually different frequency are introduced.

2. The rubber cartridge spring defined in claim 1, wherein the chambers of each pair are connected to each other via damping openings of individually different cross sections.

3. The rubber cartridge spring defined in claim 1, wherein the chambers of each pair are connected to each other via damping openings of individually different lengths.

4. The rubber cartridge spring defined in claim 1, wherein the pairs of chambers have a common chamber joining one to the other, said common chamber forming one chamber of each pair.

5. The rubber cartridge spring defined in claim 1, wherein the individual chamber pairs have walls of different bulging elasticities.

* * * * *